United States Patent Office 2,734,796
Patented Feb. 14, 1956

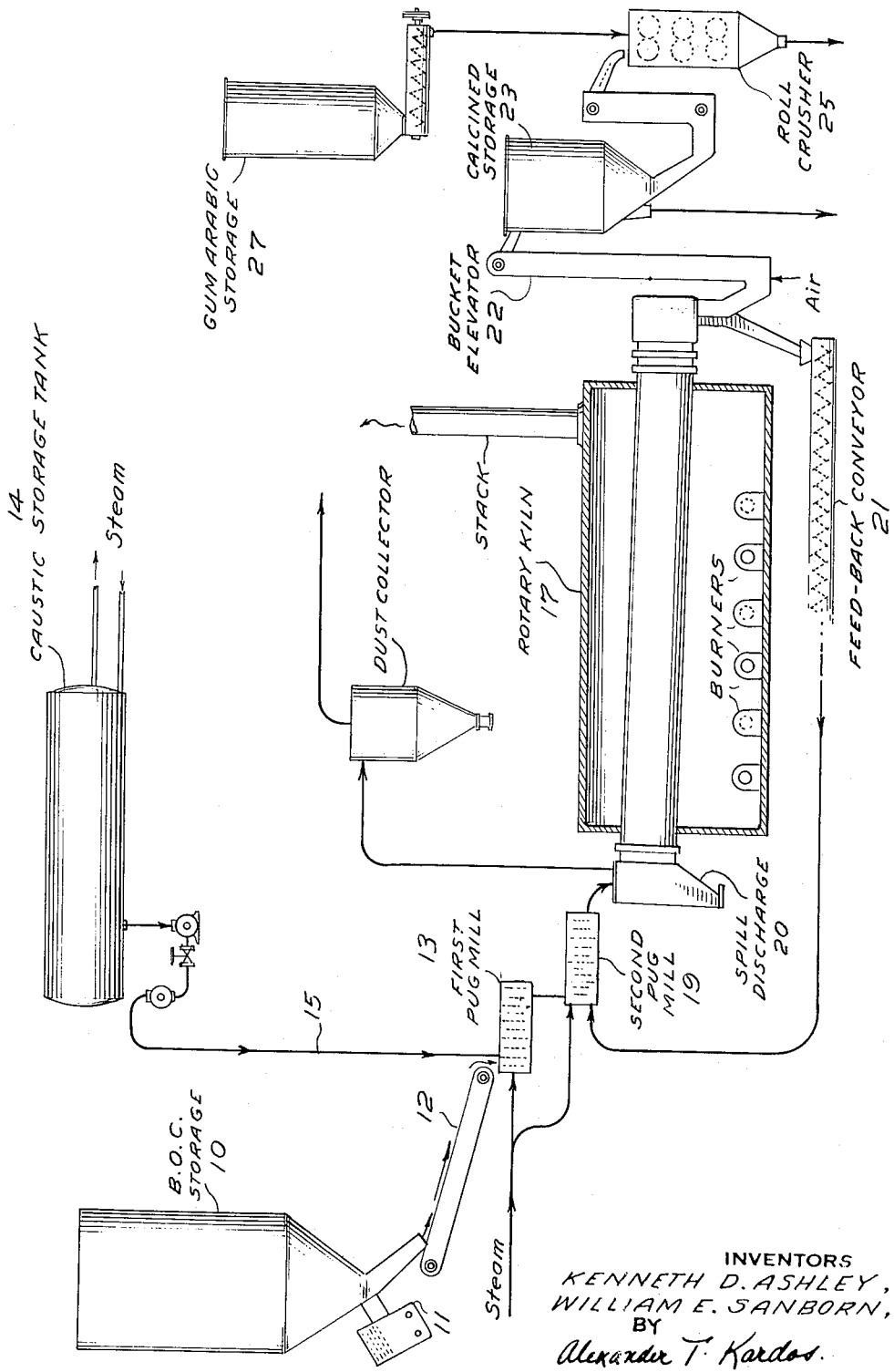

2,734,796

COMPOSITION COMPRISING STABLE SOLID SODIUM ALUMINATE AND METHOD OF MANUFACTURING THE SAME

Kenneth D. Ashley, Stamford, and William E. Sanborn, Rowayton, Conn., assignors to American Cyanamid Company, New York, N. Y., a corporation of Maine Application February 8, 1952, Serial No. 270,722

12 Claims. (Cl. 23—52)

This invention relates to new and improved compositions of matter containing solid sodium aluminate which, when dissolved in water, will yield solutions which are relatively stable for a considerable period of time, and to the manufacture of such novel compositions of matter.

Sodium aluminate is usually made commercially by digesting or reacting bauxite or aluminum trihydrate with excess caustic and diluting the resulting liquor for clarification by setting. The clear, aqueous diluted solution of sodium aluminate is separated and is then concentrated to a viscous liquor which is charged to a direct-fired continuous roaster where the liquor is evaporated to dryness to yield the finished product.

Considerable sticking of the materials to the walls of the roaster during drying has been encountered due to the viscous nature of the sodium aluminate. This has always been a difficulty in the manufacturing process inasmuch as such sticking disrupts the continuous nature thereof by requiring periodic halts to permit the removal of stuck materials which thus decreases the productive capacity of the process.

Additionally, during the direct-fired drying operation, the product is exposed to contamination by carbon dioxide and often can not be used for processing a stable product, particularly since the total $Na_2O$ content would be limited by specification. Indirect drying methods have been resorted to in order to solve the carbon dioxide contamination problem and to provide a product of greater purity but such have merely increased the sticking tendencies of the material in the drying roaster during drying.

A more important objection to prior commercial products, however, was the lack of stability of the sodium aluminate when placed in solution, as evidenced by a rapid precipitation of aluminum hydroxide in the form of a brown sediment, which rendered the solution useless for many specific uses. Such a precipitation would frequently occur rapidly from a 10% solution even before the complete dissolving of the soluble material has taken place, or in a matter of a few hours, at best.

Furthermore, organic matter present in the bauxite frequently imparted a noticeable color to the sodium aluminate solutions and this was considered objectionable particularly where clear, colorless solutions were necessary. Chemical oxidation of the organic matter has been employed to remove the cause of the coloring but it has been found that such oxidation lowered even further the stability of the sodium aluminate solution.

It is known that these solutions of sodium aluminate may be made more stable and the tendency of the aluminum hydroxide to precipitate may be suppressed or prevented by the presence of a large excess of caustic over that theoretically required to react with the aluminum trihydrate to produce sodium aluminate. For example, sodium aluminate containing a molar excess of $Na_2O$ with respect to $Al_2O_3$ in a ratio of 1.25 and above has been found to form solutions which are sufficiently stable over acceptably long periods of time, whereas solutions having a molar excess ratio of less than 1.25 have been found to be unstable. This excess of caustic, although probably not objectionable in some uses of sodium aluminates, is expensive and is highly undesirable in many industries, such as, for example, in the paper making art and the like, and this method of stabilization of sodium aluminate has not found favor in such industries.

It has also been known to add stabilizing agents or substances to sodium aluminate solutions which prevent or retard the spontaneous precipitation of aluminum hydroxide. Many of these, however, have affected the solutions deleteriously for the particular purpose for which they were ultimately used, such as, for example, by imparting color thereto, or by interfering in one way or another. Additionally, many of these stabilizing agents are rather expensive or must be used in such substantial proportions that they have undesirably raised the cost of the sodium aluminate solutions. These disadvantageous features have naturally severely limited the usefulness of these stabilizing substances.

The present invention has for one of its principal objects the provision of compositions of matter containing solid sodium aluminate which will be easily dissolvable in water and which will form substantally clear solutions in which the tendency of aluminate hydroxide to separate out or form a precipitate will be retarded or suppressed for a considerable period of time.

Another principal object of the present invention is the provision of compositions of matter containing solid sodium aluminate capable of forming stabilized solutions in which there exists such a slight excess of caustic over that required to produce sodium aluminate that, without the addition of a stabilizer, they could not withstand water dilution to a 10% solution so as to be acceptable in the paper making art and like industries.

Still another principal object of the present invention is the provision of a method of manufacture of sodium aluminate, which method employs a granular kiln fed material which can be dried satisfactorily without sticking to the drier walls and which is not contaminated by foreign substances such as carbon dioxide or other impurities and which may be used in processing a stable product.

A further object of the present invention is the provision of stabilizing agents for sodium aluminate solutions, which agents do not undesirably affect the solution, nor raise the cost thereof materially, and are effective in small amounts.

It is another object of the present invention to provide a composition comprising solid sodium aluminate capable of forming a 10% aqueous solution having merely an 11–15% molar excess of caustic with a maximum $NaAlO_2$ content, which solution is the preferred solution in the paper maker's art and which will remain stable over a considerable period of time.

These and other objects are accomplished by using a bauxite ore concentrate (aluminum trihydrate of commerce) and digesting the same in the proper proportions with caustic soda having a higher caustic content of up to 73% or higher, whereby a pasty sodium aluminate is obtained having the desired molar excess of caustic. This paste, if mixed in suitable proportions with completely dried sodium aluminate, forms a granular kiln feed which may be dried directly in a roaster without showing any tendency toward sticking. It has been found that the completely dried sodium aluminate required for such mixing may be obtained by diverting a portion of the drying kiln output and feeding back or recycling the same to be mixed with the pasty product resulting from the digestion of the bauxite ore concentrate and the caustic soda. It has also been found that desirable additives, such as stabilizers, may be intermixed and ground with the kiln output which is not diverted and returned, whereby a dry granular composition is obtained capable of yielding stable sodium aluminate solutions.

The invention will be further described in greater detail by referring to the accompanying drawing wherein we have set forth a preferred embodiment of our inventive concept. It should be understood, however, that although the drawing may illustrate in particular detail some of the more specific features of the invention, it is given primarily for the purpose of illustration and the invention in its broader aspects is not to be construed as limited thereto.

In the accompanying drawing, the figure is a flow sheet diagrammatically illustrating a preferred method of manufacture of the novel compositions of the present invention.

In order to prepare a more suitable sodium aluminate material to be fed into the kiln to be dried therein without sticking, a more concentrated, pasty sodium aluminate was directly prepared by the digestion of bauxite ore concentrate with caustic soda of a higher liquid content such as up to 73% liquids or higher.

Storage hoppers or tanks may be employed to insure a proper supply of the reactants required for the digestion process. A storage bin or receptacle 10 may be provided for the bauxite ore concentrate and this material may be fed in any particular fashion, such as by an electromagnetically controlled vibrator feeder 11, or the like, and a belt conveyer 12 into a first pug mill 13. The caustic soda may be stored in a large supply tank 14 which may be heated in any desired fashion, such as by steam. The caustic may be pumped through supply lines 15 into the first pug mill 13 where it reacts with and digests the bauxite ore concentrate. The relative feeds of the bauxite ore concentrate and the caustic soda are selectively predetermined so as to provide the desired and proper molar excess of caustic soda of approximately 11–15%, although other ratios are possible, and may be used if desired.

The first pug mill 13 may be provided with a plurality of compartments and is preferably steam-jacketed and heated by low pressure steam. Any pressure of steam and any desired degree of heat may be utilized to facilitate the digestion process and the formation of sodium aluminate but it has been found that a steam pressure of the order of 20 lb. per sq. in. is satisfactory in maintaining the preferred temperature range of 100–110° C. The passage of the reactants through the first pug mill is so controlled that a retention time of approximately one hour is provided for satisfactory digestion.

The sodium aluminate leaving the first pug mill 13 is in a pasty condition but is not quite suitable for feeding immediately to a drying kiln or calciner 17 inasmuch as sticking thereof is encountered. However, such sticking is not as serious as that resulting from the prior art use of the concentrated sodium aluminate liquor derived after the usual procedure involving the dilution, clarification by settling, separation and concentrating steps.

It was found that if a portion of the dried sodium aluminate being discharged from the kiln 17 could be fed back and intermixed with this pasty material, the resultant composite product formed an ideal granular kiln feed which could be charged to a roaster and dried therein without exhibiting any tendency toward sticking.

The percentage of feedback could be varied within reasonable limits, such as from about 40% to about 80% or higher, and it was found preferable, for the purposes of carrying out the present invention, to employ a feedback of approximately 50%. Such a value was found to be most efficient and economical; whereas values below 40% tended to create a sticking problem and values above 60% tended to be less economical. This feedback mixing could take place in any desired type of mixer but it has been found preferable to use a second pug mill 19 similar to the first pug mill 13 but without compartments and heated by any desired means, such as, for example, a steam jacket. The volumes or capacities of both pug mills and the rate of mixing and passage therethrough were so selected that a preferred overall retention time of approximately 1 hour was obtained in each pug mill. This insured a thorough digestion in the first mill 13 and a thorough intermixing in the second mill 19 with a minimum number of lumps present in the resulting kiln feed which thus facilitated the drying operation. These values, of course, could be varied, as desired, depending upon the conditions affecting the particular situation.

The kiln feed issuing from the second pug mill 19 is a semi-dry granular non-sticking material which is still moist enough to bridge in a feed hopper. The feedback mixer discharge gate should be located on the end plate of the second mill to give overflow discharge and a paddle feeder may be used for advancing the kiln feed to the kiln. A spill discharge 20 may be provided at the entrance to the kiln to facilitate the feeding thereinto of the kiln feed.

Thus, it is seen that the kiln feed comprises a mixture of the sodium aluminate paste coming from the first pug mill 13 and the portion of the dried feedback sodium aluminate being recycled from the discharge end of the kiln roaster 17. After mixing in the second pug mill 19, there is obtained a semi-dry non-sticking material with a concentration of approximately 65–71% or higher solids which is capable of being fed into any desired drying roaster and dried therein without showing any tendency toward sticking.

In order to prevent the contamination of the product by carbon dioxide, which is extremely likely especially during heating, a protective procedure employing an indirect drying operation was devised. The indirect-fired rotary calciner, or kiln 17 was found to offer the best possibilities by possessing the lowest operating cost as well as the lowest equipment cost. By such a protective, indirect procedure, the possibility of carbon dioxide contamination was reduced to substantially a negligible factor.

For starting up the drying operation in the rotary kiln, sodium aluminum paste should be made up beforehand batchwise and then further heated in the uncovered pug mills 13, 19 until balling occurs at about 65–71% solids. A heavy paste was found to exist normally at a concentration of about 65–68% solids, whereas a balled semi-dry material was obtained usually at a concentration of about 69–71% solids. The use of either of these materials has been found to avoid sticking in the kiln, although the balled form is preferred because of the better feeding consistency. This material can then be manually fed into the kiln and dried therein without exhibiting any tendency toward sticking. Two 1-hour batches made in this manner and dried and milled will supply sufficient feedback for normal operation of the second pug mill and kiln until an automatic supply of sodium aluminate paste and dried sodium aluminate can be obtained continuously.

For example, the starting-up operation may be as follows: the reactants are fed to the first pug mill 13 (now covered) and the digestion thereof begins. At the same time, the second pug mill 19 (now also covered) is filled with the previously dried sodium aluminate and is maintained full so that a suitable non-sticking kiln feed enters the kiln 17 at once to be dried therein. By the time the first pug mill 13 begins to yield a thoroughly intermixed and completed digested pasty sodium aluminate product, there will be available sufficient completely dried sodium aluminate issuing from the kiln 17 for recycling back to be mixed with the paste to form the material for charging the second pug mill 19. From then on, the process is substantially continuous.

The temperature of the kiln or furnace may be varied depending upon the nature and solids content of the particular material being fed thereinto, upon the rate of feed of such material, and upon the capacity of the kiln. For example, at feed rates of up to 4 pounds per hour per square foot of heated kiln area for materials having a solids content of 65–71%, the furnace temperature may be maintained at 985° F., for example, whereby the maximum materials temperature will be maintained at approximately 750° F.

A materials temperature of approximately 750° F. was found preferable inasmuch as the organic matter contained in the material was oxidized by calcination at that temperature after a treatment of merely 15 minutes whereby the possibility of harmful effects such as colored solutions was substantially completely avoided. An air sweep may be provided whereby air is drawn into the kiln to expedite the oxidation process and to carry off any gases or fumes involved. This air sweep may draw in air at any desired point in the apparatus, as at the base of the bucket elevator 22, as shown in the drawing. At the same time, it was discovered that such oxidation by calcination improved the stability of the resulting solution when the sodium aluminate was dissolved in water. Thus, it is seen that drying and calcination can be carried out in a single indirect-fired kiln of heat- and corrosion-resistant construction. The temperature limits for the materials may be as low as about 650° F. or as high as about 1000° F., the lower temperature values being preferred, if possible, in the interests of economy, provided they accomplish the necessary oxidation.

The materials as discharged from the kiln in the continuous runs may have varying screen analyses depending upon the raw materials, the operating conditions, etc., and an example is given below for the purpose of illustrating one particular screen analysis:

| Mesh: | Percentage |
|---|---|
| +2 | 3.7 |
| −2, +6 | 22.1 |
| −6, +10 | 11.0 |
| −10, +16 | 8.9 |
| −16, +20 | 3.8 |
| −20, +30 | 5.2 |
| −30, +100 | 12.0 |
| −100 | 33.3 |
|  | 100.0 |

The calcined material being discharged from the kiln has about the same millability as burned lime, and was easily milled, using a three stage roll milling, to 100% −10 mesh and about 50% −100 mesh. Production milling may be carried out to any degree of fineness but is preferably carried to −30 mesh for greater ease of solution.

At the discharge end of the kiln 17, the issuing material is divided into two portions, one of which returns through an enclosed screw conveyer feedback device 21 to be mixed with the pasty sodium aluminate in the second pug mill 19, the other portion being conveyed to a bucket elevator 22 wherein it is raised and placed in a storage receptacle 23 for the calcined material. Means may be provided in the calcined materials storage receptacle to remove materials therefrom, if desired, for supplying mixing materials for the manual start-up feedback operation.

The calcined materials are then delivered to any suitable grinding or milling device such as a three-stage roll crusher 25, wherein the lumpy material is reduced to a sufficiently fine granular material, as desired, for ease of solution. This finished product is then suitable for bagging or storage in any desired form.

Investigation of the phase diagram for the system $Na_2O—Al_2O_3—H_2O$ indicated that a 10% aqueous solution of sodium aluminate having a molar excess of merely 0.115 to 0.155 of $Na_2O$ with respect to $Al_2O_3$ (i. e. an 11.5% to 15.5% molar excess) is inherently unstable under the conditions normally encountered in the industry. As a consequence, the use of a stabilizing agent was indicated in order to obtain the desired stability and to prevent the precipitation of the aluminum hydroxide. At the same time, it was essential that such a stabilizer not upset the preferred molar ratio of $Na_2O$ to $Al_2O_3$, nor create deleterious effects on the solution.

Organic stabilizers known to the art have been found to be ineffective in the small amounts required for the purposes of this invention and necessarily had to be added in undesirably greater concentration than permitted by the requirements of the art or industry. A few organic stabilizers were moderately effective in amounts approaching the prescribed ranges but had inherent disadvantages such as much higher cost, color-imparting characteristics, etc., which severely limited their usefulness.

It was found that gum arabic was admirably suited for such a stabilizing purpose. It was established, for example, that sufficiently small amounts of gum arabic stabilized a 10% solution of sodium aluminate formed from aluminum trihydrate and caustic having approximately a 15 percent molar excess of $Na_2O$ with respect to $Al_2O_3$. This solution remained stable for considerable periods of time without exhibiting any aluminum hydroxide precipitation.

It was also established that four months' storage of the stabilized product in closed glass containers which were tightly stoppered did not affect the properties of the solution eventually prepared, and that there was merely slight caking of the dried product.

The gum arabic appears to perform its stabilizing function by a protective colloid action and does not appear to form any complex aluminum-organic compounds. It is ideally suited for its intended purpose herein in view of its remarkable effectiveness and its relative availability and cheapness.

A series of shelf-tests was made in which stabilized sodium aluminate was stored in double thickness kraft bags. The material caked somewhat but did not lose stability over a one month period.

Additional specific tests on solid sodium aluminate containing ranges of 10–20% molar excess of caustic indicated that stable solutions could be formed therefrom by the addition to the solid sodium aluminate of from about 0.5 to about 2.5% gum arabic by weight with respect to the sodium aluminate, with the preferred range being noted as lying from about 1.0% to about 1.5% of gum arabic.

The gum arabic is stored in any desired receptacle 27 and is preferably added at a point immediately prior to the grinding or milling, and is desirably in a powdered form so as to be readily mixed with the dried sodium aluminate. However, it may be added at other points in the process, as desired. The material issuing from the roll crusher 25 may then be conveyed by any desired means such as the pneumatic conveyor or the like to be placed in a finished product storage receptacle or in a hopper or placed directly in bags or used in any other desired fashion.

The invention will be further described in greater detail by the following specific examples. It should be understood, however, that, although these examples may describe in greater detail some of the more specific features of the invention, they are given primarily for purposes of illustration and the invention in its broader aspects is not to be construed as limited thereto.

*Example 1*

As an example of the preparation of the solid, solution-stable grade sodium aluminate, 39.5 lbs. of 73% liquid caustic, ammonia-soda grade, as supplied by Solvay, was mixed with 50.5 lbs. of commercial aluminum trihydrate, "Alcoa" C–33 grade, in a steam-jacketed vessel provided with an agitator. The temperature was maintained at approximately 100–110° C. until the reaction was completed and a thin paste formed. If desired, the thin paste may be dried to a crumbly mass by continued heating in the agitated vessel. However, it was preferably mixed in a pug mill with previously dried materials having substantially the same $Na_2O—Al_2O_3$ ratio which resulted in a granular material which could then be dried, without sticking, preferably in an indirect-fired kiln to prevent contamination with carbon dioxide and calcined, if a color-free product was desired. The dried sodium aluminate discharged from the kiln may then be ground to suitable size for ease of solution, for example, to 100% through a 10 mesh screen. Finely divided gum arabic, powdered U. S. P., in an amount of about 1.5% based on solids may be added to the sodium aluminate prior to milling and milled together. The resulting product was readily dissolved in water to give, for example, a 10% solution which remained stable for a period of greater than 2 months.

*Example 2*

As another example of the preparation of the solid, solution-stable grade sodium aluminate, substantially the same proportions were used as set forth in the example above mentioned, with the only change made being the use of an electrolytic grade caustic.

A solution prepared from such a sodium aluminate remained stable up to 5 days. Should it be desired to form solutions which will remain stable for greater than 5 days, such as up to three months, it has been found that the addition of small amounts of silica are extremely efficacious in attaining such stability. The quantity of silica added may be on the order of but a few hundredths of a percent up to as much as 1.2%. In the present invention it was found that the stabilities of the products could be considerably improved by the addition of from about 0.08 to about 1.2% silica on solids along with the gum arabic. In the particular case employed, it was found that 0.6% silica on solids along with 1.2% gum arabic stabilized the solutions formed from the sodium aluminate for acceptably long periods of time. If silica is required to be added to the process, such as when electrolytic caustic is used, it may be added at any desired point either with the gum arabic or it may be added directly to the caustic soda in its storage tank.

When the raw materials contain even small amounts of impurities, such as iron, the stabilized sodium aluminate solution may form a small amount of precipitate, although the alumina remains in solution. Such a precipitate is usually not objectionable. However, we have found that it may be prevented by the addition of a small amount of gluconic acid, or its sodium salt, to the dry product. The amount of gluconic acid required is very slight and may be in the range of 0.2–0.5% on solids.

From the foregoing it will be seen that we have devised an improved method of producing solid sodium aluminate wherein no sticking tendencies of the materials are exhibited during the drying operation and in which the possibility of carbon dioxide contamination is reduced to a minimum. The dry product of the method is readily dissolvable to form aqueous solution, such as of the order of 10%, which solutions are colorless and which remain stable for extended periods of time without precipitating any aluminum hydroxide. All this is possible even with such slight molar excess ratios of caustic on the order of 1.115 to 1.155 and with the addition of very small amounts of the required stabilizers.

Although we have described but a few specific examples of our invention, we consider the same not to be limited thereby nor to the specific substances mentioned therein, but to include various other equivalent compounds of similar constitution as set forth in the claims appended hereto. It is understood that any suitable changes or variations may be made without departing from the spirit or scope of the invention.

We claim:

1. As a new composition of matter, solid sodium aluminate containing a molar excess of $Na_2O$ with respect to $Al_2O_3$ in a ratio of from about 1.115 to about 1.155 and containing minor amounts of gum arabic sufficient to suppress the tendency of aluminum hydroxide to separate out for a considerable period of time, when said composition is dissolved in water to form a substantially clear solution.

2. As a new composition of matter, solid sodium aluminate containing a molar excess of $Na_2O$ with respect to $Al_2O_3$ in a ratio of from about 1.115 to about 1.155 and containing minor amounts of gum arabic and silica sufficient to suppress the tendency of aluminum hydroxide to separate out for a considerable period of time, when said composition is dissolved in water to form a substantially clear solution.

3. As a new composition of matter, solid sodium aluminate containing a molar excess of $Na_2O$ with respect to $Al_2O_3$ in a ratio of from about 1.115 to about 1.155 and containing 0.5 to 2.5 per cent gum arabic and 0.08 to 1.2 per cent $SiO_2$, said percentages being based on the weight of the contained sodium aluminate, said composition being easily soluble in water to form a substantially clear solution in which the tendency of aluminum hydroxide to separate out is suppressed for a considerable period of time.

4. As a new composition of matter, solid sodium aluminate containing a molar excess of NaO with respect to $Al_2O_3$ in a ratio of from about 1.115 to about 1.155 and containing 1.0 to 1.5% gum arabic and 0.08 to 0.11% $SiO_2$, said percentages being based on the weight of the contained sodium aluminate, said composition being easily soluble in water to form a substantially clear solution in which the tendency of aluminum hydroxide to separate out is suppressed for a considerable period of time.

5. A method of stabilizing a solid water-soluble composition containing sodium aluminate comprising adding 0.5 to 2.5% powdered gum arabic to dry, granular sodium aluminate containing a molar excess of $Na_2O$ with respect to $Al_2O_3$ in a ratio of from about 1.115 to about 1.155 and thoroughly intermixing the same to form a dry composition easily soluble in water to form a substantially clear solution in which the tendency of aluminum hydroxide to separate out is suppressed for a considerable period of time.

6. A continuous process of manufacturing a solid water-soluble composition containing sodium aluminate, said composition being easily soluble in water to form a substantially clear solution in which the tendency of aluminum hydroxide to separate out is suppressed comprising digesting aluminum hydrate in aqueous sodium hydroxide to form a paste of sodium aluminate having a molar excess of $Na_2O$ with respect to $Al_2O_3$; mixing said paste with previously dried material obtained by drying said paste and having substantially the same $Na_2O$—$Al_2O_3$ ratio and forming a non-sticking kiln-feed material therewith; and drying said kiln-feed material while simultaneously returning a portion of the resulting dried material to be mixed with additionally formed paste to form additional non-sticking kiln-feed material to be dried.

7. A continuous process of manufacturing a solid water-soluble composition containing sodium aluminate, said composition being easily soluble in water to form a substantially clear solution in which the tendency of aluminum hydroxide to separate out is suppressed comprising digesting aluminum hydrate in aqueous sodium hydroxide to form a paste of sodium aluminate having a molar excess of $Na_2O$ with respect to $Al_2O_3$; mixing said paste with previously dried material having substantially the same $Na_2O$—$Al_2O_3$ ratio and forming a non-sticking kiln-feed material therewith having a solids content of from about 65 to about 71%; and drying said kiln-feed material while simultaneously returning between about 40 to about 60% of the resulting dried material to be mixed with additionally formed paste to form additional non-sticking kiln-feed material to be dried.

8. A continuous process of manufacturing a solid water-soluble composition containing sodium aluminate comprising digesting aluminum hydrate in aqueous sodium hydroxide to form a paste of sodium aluminate having a molar excess of $Na_2O$ with respect to $Al_2O_3$ in a ratio of from about 1.115 to about 1.155; mixing said paste with previously dried material having substantially the same $Na_2O$—$Al_2O_3$ ratio and forming a non-sticking kiln-feed material therewith; drying said kiln-feed material while simultaneously returning one portion of the resulting dried material to be mixed with additionally formed paste to form additional non-sticking kiln-feed material to be dried; and incorporating in the other portion of the resulting dried material minor amounts of gum arabic sufficient to suppress the tendency of aluminum hydroxide to separate out for a considerable period of time after the composition has been dissolved in water to form a substantially clear solution.

9. A continuous process of manufacturing a solid water-soluble composition containing sodium aluminate comprising digesting aluminum hydrate in aqueous sodium hydroxide to form a paste of sodium aluminate having a molar excess of $Na_2O$ with respect to $Al_2O_3$ in a ratio of from about 1.115 to about 1.155; mixing said paste with previously dried material having substantially the same $Na_2O$—$Al_2O_3$ ratio and forming a non-sticking kiln-feed material therewith; drying said kiln-feed material while simultaneously returning one portion of the resulting dried material to be mixed with additionally formed paste to form additional non-sticking kiln-feed material to be dried; and incorporating in the other portion of the resulting dried material from about 0.5 to about 2.5% gum arabic to suppress the tendency of aluminum hydroxide to separate out for a considerable period of time after the composition has been dissolved in water to form a substantially clear solution.

10. A continuous process of manufacturing a solid water-soluble composition containing sodium aluminate comprising digesting aluminum hydrate in aqueous sodium hydroxide to form a paste of sodium aluminate having a molar excess of $Na_2O$ with respect to $Al_2O_3$ in a ratio of from about 1.115 to about 1.155; mixing said paste with previously dried material having substantially the same $Na_2O$—$Al_2O_3$ ratio and forming a non-sticking kiln-feed material therewith; drying said kiln-feed material while simultaneously returning a portion of the resulting dried material to be mixed with additionally formed paste to form additional non-sticking kiln-feed material to be dried; and incorporating in the other portion of the resulting dried material from about 0.5 to about 2.5% gum arabic and from about 0.08 to about 1.20% $SiO_2$, said percentages being based on the weight of the contained sodium aluminate, to suppress the tendency of aluminum hydroxide to separate out for a considerable period of time after the composition has been dissolved in water to form a substantially clear solution.

11. The invention as defined in claim 10 wherein the silica is incorporated in the composition by employing aqueous sodium hydroxide containing the requisite amount of sodium silicate.

12. A continuous process of manufacturing a solid water-soluble composition containing sodium aluminate, said composition being easily soluble in water to form a substantially clear, colorless solution comprising digesting aluminum hydrate in strong aqueous sodium hydroxide to form a wet sodium aluminate paste; drying said paste; recycling a portion of said dried paste and mixing the same with additional wet sodium aluminate paste to form a non-sticking kiln-feed; and drying said kiln-feed at temperatures in the range of from about 650° to about 1000° F., whereby matter present in the kiln-feed capable of imparting color to solutions formed from the resulting dried material is removed by oxidation by calcination.

References Cited in the file of this patent

UNITED STATES PATENTS

| | | |
|---|---|---|
| 1,930,271 | Heiser | Oct. 10, 1933 |
| 2,141,132 | Folger | Dec. 20, 1938 |
| 2,159,843 | Davies | May 23, 1939 |
| 2,165,187 | Wilson | July 4, 1939 |
| 2,345,134 | Lindsay | Mar. 28, 1944 |

FOREIGN PATENTS

| | | |
|---|---|---|
| 472,426 | Canada | Mar. 27, 1951 |